United States Patent [19]
James

[11] 4,002,363
[45] Jan. 11, 1977

[54] AUTOMOTIVE BODY PROTECTIVE APPARATUS

[76] Inventor: John R. James, 6334-A Crestline Terrace, Norcross, Ga. 30071

[22] Filed: Sept. 12, 1975

[21] Appl. No.: 612,940

[52] U.S. Cl. ............................. 293/62; 293/DIG. 4
[51] Int. Cl.² ........................................ B60R 13/04
[58] Field of Search ......................... 293/62, DIG. 4

[56] References Cited
UNITED STATES PATENTS 2,889,165  6/1959  Zientara ...................... 293/DIG. 4

*Primary Examiner*—Stanley H. Tollberg
*Assistant Examiner*—Hadd S. Lane

[57] ABSTRACT

Apparatus for protecting the doors and other side members of an automotive vehicular body from damaging contact by foreign objects such as doors of adjacent vehicles. The present protective apparatus, which is particularly useful for protecting automobiles in parking lots or other locations where parked in close proximity, includes a number of elongate protective members disconnectably joined together by resilient elongatable means to form an array which extends alongside an automobile. Attachment members are provided at both ends of the array for attachment to locations such as the wheel openings in the fenders of an automobile. The resilient interconnection of the separate elongate members allows the members to be readily folded back alongside one another to provide a compact and easily-stowed article, when removed from the outside of an automobile. The members include a locking feature which engages a locked door of an automobile to prevent theft of the protective apparatus.

10 Claims, 5 Drawing Figures

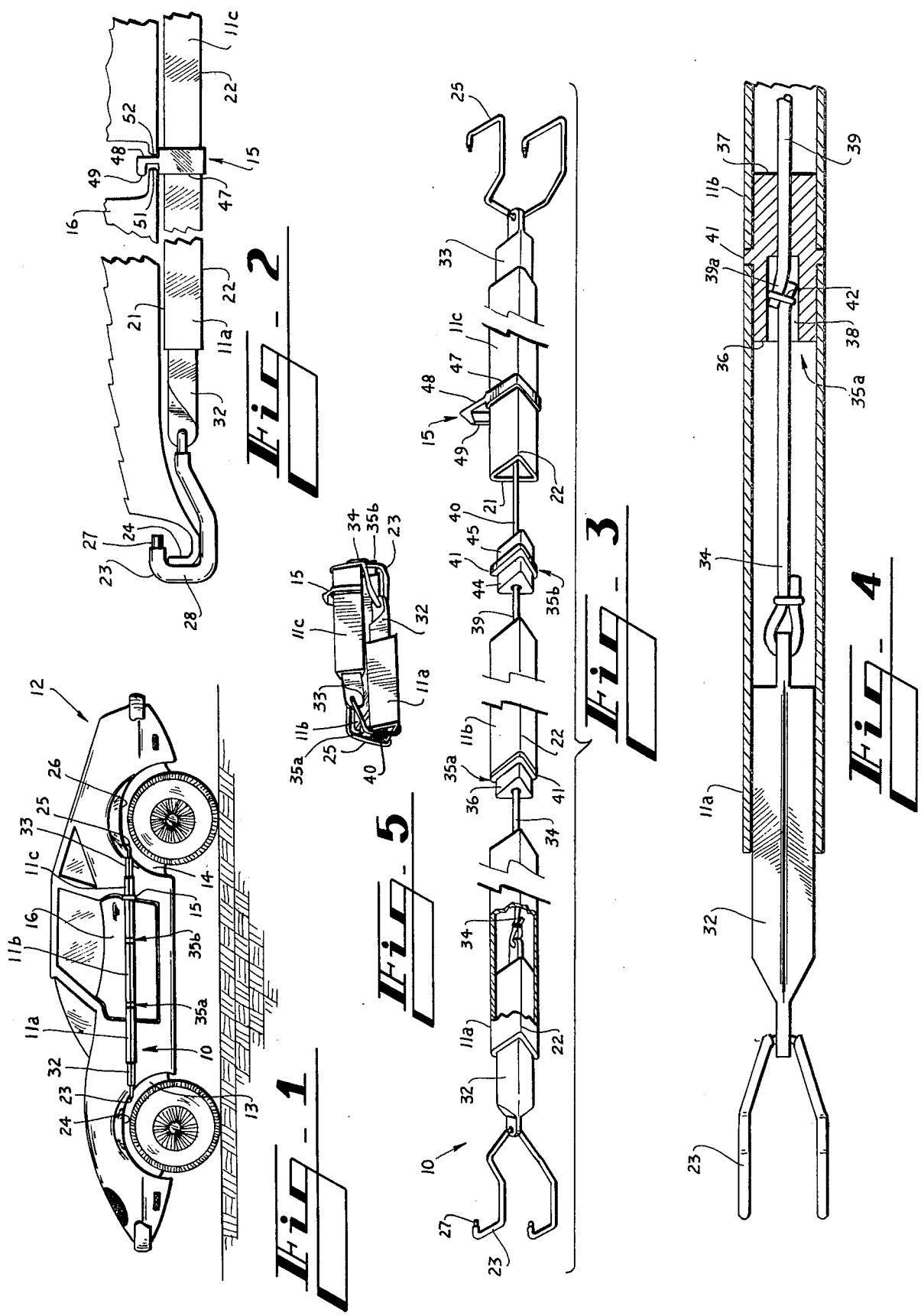

AUTOMOTIVE BODY PROTECTIVE APPARATUS

This invention relates in general to apparatus for preserving and protecting the body of an automotove vehicle, and in particular to an apparatus for protecting the body surface of an automobile or the like from minor dents, scratches, and other imperfections resulting from impingement of objects such as carelessly-opened doors of an adjacent automobile or the like.

Most motorists are well aware that their automobiles are subject to becoming damaged in parking lots and other locations where automobiles are parked in close proximity. Such damage typically takes the form of scratches, dents, chipped paint, abrasions, and related damage to the surface finish and possibly the underlying body material as well; such damage is frequently referred to as "dings" in the automobile body. Although dings can be caused by any foreign object which strikes the automobile with sufficient force to damage the body surface, dings frequently occur when the door of an adjacent automobile is opened with sufficient force to impact one's own automobile, causing the edge of the opened door to chip or otherwise mar the paint finish, at the least, and possibly causing a minor dent in the body material as well. While even a single such ding can be annoying, particularly to the owner of a new or well-maintained automobile, the collective result of frequently parking an automobile in parking lots or like locations is that the sides of the car soon become covered with unsightly areas of chipped paint, minor dents, and other imperfections which detract from the overall appearance of the automobile and reduce its resale value.

While various prior art devices have been proposed to overcome the foregoing problem, such devices have various practical problems which have prevented commercial success. Some automobiles, for example, are equipped by the manufacturer with a molding strip which extends along the doors and other side panels and which, hopefully, will absorb impacts from adjacent opening car doors or the like. These permanently attached molding strips are considered to be unsightly by some automobile owners, however, and even when used, the side moldings frequently offer no protection against adjacent car doors having particular shapes which extend above or below the molding.

It has also been proposed in the art to provide a removable protective bumber-like apparatus which can be temporarily attached to the side(s) of one's own automobile, so that opening car doors or other objects will impact the bumper rather than the side of the automobile. Such removable devices, in the prior art, are awkward to stow and carry in the car, when not used, particularly where the protective device may be used on a sports car or subcompact automobile which offers relatively little trunk space for stowing a bumper of unwieldy configuration. Other removable devices have included relatively expensive and cumbersome size-adjustment apparatus, or have been readily removed from a parked car by unauthorized persons bent on thievery.

Stated in general terms, the present invention includes a plural number of elongated protective members which are removably joined together by elastic means to provide an elongated protective device. Each of the elongated protective members is resiliently connected to another such member, so that the protective members are readily separated from one another for folding while remaining interconnected. As a result, the protective apparatus which normally extends for a substantial portion of the length of an automotive body, can be made up of shorter individual elongated members which are foldable alongside one another. A locking means is provided on one of the elongated members and is receivable between the closed door and the door frame of an automobile, so that the protective apparatus cannot be removed unless the door is first unlocked and opened.

Accordingly, it is an object of the present invention to provide an improved body protective apparatus for automobiles.

It is another object of the present invention to provide automotive body protective apparatus which is collapsible to a relatively compact size for storage when not in use, and which is readily extendable to a length sufficient to protect at least a substantial portion of the side of an automotive vehicle body or the like.

It is a further object of the present invention to protect an automotive body protective apparatus which is readily adjustable to accommodate variations in vehicle body lengths.

It is a further object of the present invention to provide an automotive body protective apparatus which is nonremovably secured to the vehicle, when in protective use, yet which requires no attachment means permanently affixed to the vehicle.

Other objects and many attendant advantages of the present invention will become more readily apparent from the following description of a disclosed embodiment, as shown in the drawing in which:

FIG. 1 is a side elevation view showing an automobile to which is mounted an automotive body protective apparatus according to a disclosed embodiment of the present invention;

FIG. 2 shows a fragmentary top plan view of the apparatus shown in FIG. 1;

FIG. 3 shows an extended pictorial view of the apparatus shown in FIG. 1;

FIG. 4 shows a section view of a fragmentary portion of the disclosed embodiment; and FIG. 5 shows a pictorial view of the disclosed embodiment in folded configuration suitable for stowage or the like.

Turning to the disclosed embodiment, there is shown a protective apparatus 10 which is made up of the separate interconnected elongated members 11a, 11b, and 11c. Although the disclosed embodiment of the protective apparatus 10 is made up of three individual such elongated members, it is to be understood that the use of a greater or lesser number of individual elongated members is within the scope of the present invention. The protective apparatus 10 is depicted in FIG. 1 as being sufficiently long to extend alongside the automobile 12, from the rear edge of the front wheel cutout 13 in the front fender to the rear wheel cutout 14 in the rear fender. A locking clip 15 is connected to one of the elongated members 11c and is retained on the automobile 12 by engagement between the closed door 16 and the fixed frame 52 for the door, as described below in detail.

Turning next to FIGS. 3 and 4, it is seen that each of the elongated members 11a, 11b, and 11c is provided by a hollow elongate tubular length of material which, in the disclosed embodiment, has a generally triangular cross-section. The elongated members may be fabricated from any appropriate material, and it will be understood that the tubular elongated members may advantageously be provided by appropriate lengths of extruded plastic material such as, for example, high density polystyrene polyvinyl chloride (pvc). Other types of materials will present themselves to those skilled in the art, and no particular novelty is seen in the choice of materials in the disclosed embodiment.

The choice of a triangular cross-section tubular material advantageously provides each of the elongated members with a flat surface 21 which contacts the side of the automobile 12, when in use. It will be understood that the flat surface 21 should be relatively smooth and devoid of abrasions or any other structural feature which might mar or otherwise damage the surface finish of the automobile. Alternatively, each of the flat surfaces 21 can be provided with a smooth surface coating or covering having suitable nonmarring properties. Each of the elongated members has a physical location, such as the edge 22, which is spaced outwardly from the vehicle-contacting surface 21, and it will be seen that the edge 22 is the portion of each elongated member against which impacts from opened car doors or other foreign objects are absorbed. Such impacts are transmitted to the automobile 12 through the area of the surface 21, which distributes the impact over a substantial area of the automobile body surface.

The forward end of the protective apparatus 10 is attached to the automobile 12 by the hook member 23 which fits over or clips onto the inner edge 24 of the front wheel cutout 13. Similarly, the rear end of the protective apparatus 10 includes a hook member 25 which fits around or clips onto the inner edge 26 of the rear wheel cutout 14. Each of the hook members 23 and 25 may be made of any suitable nonmarring material such as a molded plastic substance, a wire provided with a nonmarring cover, or the like, and it is particularly shown in FIG. 2 that the hook member 23 includes an inner core wire or rod 27 having an elastomeric cover 28 to protect the finish of the automobile body while providing sufficient rigidity and strength for the retention of the protective apparatus in place as shown in FIG. 1.

Each of the hook members 23 and 25 is connected to a corresponding end member 32 and 33, and each of these end members is telescopically slidably received within an end of the corresponding elongated members 11a and 11c, respectively, at the two ends of the protective apparatus 10. Considering first the end member 32, with reference to FIG. 3, the end member extends within the elongated member 11a and is attached to an elastically extendable member 34 which extends within the hollow interior of the elongated member to the coupling 35a, which interconnects the elongated members 11a and 11b. The elastically extendable member 34 may be provided by an elastic cord of the type commonly referred to as a bungee cord, or by any other suitable elastically extendable device.

The several elongated members 11a, 11b, and 11c are interconnected to provide the generally-linear arrangement of protective apparatus, as shown in FIG. 1 and in extended view in FIG. 3. Each adjacent pair of interconnected elongated members 11a, 11b and 11b, 11c are detachably joined together by the coupling members 35a and 35b. Considering the coupling 35a, for example, it is seen that this coupling has first and second end portions 36 and 37, each of which is of a configuration and size to allow the respective end portions to fit telescopically within the open ends of the adjacent interconnected elongated members 11a and 11b. At least one of the end portions 36 and 37 must be freely slidable within the open end of the corresponding elongated member, so that the two adjacent elongated members 11a and 11b can be readily separated simply by sliding the coupling 35 out of at least one such elongated member. Although both of the end portions 36 and 37 may be slidably received within the corresponding elongated members 11a and 11b, it may be preferable to secure the coupling member within one of the elongated members 11a or 11b; such securement may be accomplished by an interference fit or an adhesive bond of the end portion 37, for example, within the open end of the elongated member 11b. Each of the couplings 35 has a flange portion 41 which is located between the end portions 36 and 37, and which extends outwardly to provide an outer surface which is substantially flush with the sides of the adjacent interconnected members 11a and 11b.

As best seen in FIG. 4, the elastically extendable member 34 extends through the length of the elongated member 11a and is received within an axial opening 38 formed in the end portion 36 of the coupling 25a. A second elastically extendable member 39 has a first end 39a which is attached to the end of the extendable member 34 within the opening 38 in the end portion 36; the elastically extendable member 39 extends through the coupling member 35a and thereafter extends along the hollow interior of the elongated member 11b to enter the second coupling member 35b. Still another elastically extendable member 40 interconnects with the extendable member 39, within the coupling member 35b, and the extendable member 40 lies within the elongated member 11c for interconnection with the portion of the end member 33 which is telescopically received within the elongated member 11c. Each of the extendable members may be similar to the extendable member 34, as described above. The interconnected extendable members can be fastened together with any suitable means such as the surrounding loop 42 or the like. A single extendable member connected to the end members 32 and 33, and extending through the elongated members 11a . . . 11c and through the coupling 35a and 35b, may be substituted for the separate interconnected extendable members of the disclosed embodiment.

The coupling member 35b may be substantially identical to the member 35a, so that at least one of the end portions 44 and 45 is freely telescopically received within the adjacent open ends of the corresponding elongated members 11b and 11c. Each of the elastically extendable members, 34, 39, and 40 is selected to be in a state of tension-producing elongation, when the protective apparatus 10 is joined together in linear array as shown in FIG. 1 and fragmentarily shown in FIG. 4. With the elongated members 11a and 11b joined together by the coupling member 35a, and with the members 11b and 11c joined together by the coupling member 35b, accordingly, it will be understood that the elastically extendable member 39 is in tension which urges the coupling members 35a and 35b toward each other. Each of the elastically extendable members 34 and 40 function in a similar manner to urge a respective one of the coupling members, and one of the end members 32 and 33, toward each other so that such members are telescopically urged into the respective elongated members 11a and 11c. The tension force of the elastically extendable members thus tends to maintain the protective apparatus 10 in its linearly extended and interconnected position, as generally shown in FIGS. 1 and 4.

The locking clip 15, which is attached to the elongated member 11c in the disclosed embodiment, includes a sleeve 47 which preferably has an interior shape complementary to the exterior cross-section shape of the elongated member 11c, and which is freely slidable along that elongated member. A web 48, which is preferably formed integrally with the sleeve 47, extends outwardly from the sleeve and the elongated member 11c approximately perpendicularly to the automobile-confronting surface 21, as best seen in FIG. 2. The web 48 terminates in a flange 49 having a substantially greater longitudinal dimension, measured along the linear direction of the elongated member 11c, than does the web 48.

When it is desired to attach the protective apparatus 10 to an automobile, one of the hook members 23 and 25 is appropriately engaged at the inner edge 24 of the corresponding wheel cutout. The other such hook member is then engaged with the inner edge of the other wheel cutout, and it will be appreciated that such hook member engagement typically requires telescopic extension of the end members 32 and 33, and elastic extension of the extendable members 34, 39, and 40. The protective apparatus 10 is now retained in place alongside the automobile 12, as viewed in FIG. 1, with the hook members 23 and 25 being urged against the inner edges of the respective wheel cutouts by the force of the elastically extendable members.

When the protective apparatus 10 is installed as aforementioned, the locking clip 15 is slidably disposed along the elongated member 11c to be positioned alongside the rear opening of the automobile door 16. The door is then opened sufficiently to allow the flange 49 of the locking clip to be disposed between the protruding rear edge 51 of the door 16 and the confronting edge 52 of the door frame. The door 16 is then closed and locked, and it is seen from FIG. 2 that the web 48 of the locking clip is sufficiently narrow to extend between the edges 51 and 52 while the door remains closed. It will be equally apparent that the flange 49 is now retained in place by the edge 51 of the locked door 16, making it impossible for anyone to remove the protective apparatus 10 without first unlocking and opening the door 16 of the automobile. The locking clip 16 thus prevents unauthorized removal of the protective apparatus 10 from the automobile, which might otherwise occur as a consequence of casual thievery by persons strolling through parking lots.

After the protective apparatus 10 is removed from the automobile by first opening the door 16 to free the locking clip 15, and thereafter removing the hook members 23 and 25 from the respective wheel cutouts, the apparatus 10 can be readily folded into the compact configuration shown in FIG. 5. Folding is accomplished by separating each of the elongated members 11a, 11b, and 11c, in opposition to the resilient force of the elastically extendable members, so that the protective apparatus assumes the extended position shown in FIG. 3. The two elongated members 11a and 11b are then folded to lie alongside of each other, as shown in FIG. 5, using the elastic properties of the extendable member 34 to provide a folding hinge. Similarly, the elongated member 11c is folded back alongside the member 11b, as shown in FIG. 5, so that all of the elongated members now lie alongside each other in parallel relation. Since the resilient nature of the elastically extendable members urges the folded protective apparatus 10, if released, to reassume the linear extended position shown in FIGS. 1 and 4, the folded position is maintained by attaching the hook member 23 to one end of the elongated member 11c, and by attaching the hook member 25 to one end of the elongated member 11a, as shown in FIG. 5, so that the protective apparatus 10 is now retained in a relatively compact folded configuration which can readily be stored in many locations within the automobile 12.

It will be apparent that the foregoing relates only to a disclosed embodiment of the present invention, and that numerous changes and modifications may be made therein without departing from the spirit and the scope of the invention as set forth in the following claims.

I claim:

1. Protective apparatus for removable attachment to an exterior portion of an automotive vehicle or the like, comprising:
    a plurality of separate elongate members each having a mar-resistant surface for contact with the side of a vehicle or the like, and having an outer protion which is spaced apart from said mar-resistant surface;
    resilient means connecting together confronting ends of said separate elongate members to selectively provide an extended configuration wherein said separate elongate members extend in substantially linear end-to-end alignment for disposition alongside the vehicle, and a folded configuration wherein said resilient means is yieldingly deformed to permit said separate elongate members to be folded back alongside one another; and
    means disposed at the nonconfronting ends of said elongate members, which form the free ends of said extended configuration, to removably attach said protective apparatus in said extended configuration to a side of the vehicle 2. Apparatus as in claim 1, wherein at least one said removable attachment means comprises hook means to engage a body portion which defines a wheel opening of an automobile body.

3. Apparatus as in claim 1, wherein at least one of said removable attachment means is connected to an adjacent one of said elongate members by elastic means which permits elastic extension of the attachment means relative to said adjacent elongate member, so that said attachment means is elastically urged toward said adjacent elongate member.

4. Apparatus as in claim 1, comprising:
    means attached to one of said elongate members and including a portion which extends into retaining engagement with a closed door of the automobile.

5. Apparatus as in claim 1, wherein:
    said elongate members are hollow; and
    said resilient means comprise elastic cord means extending serially through each of said elongate members and exerting resilient force tending to urge said interconnected elongate members to assume said extended configuration.

6. Protective apparatus for removable attachment onto the side of an automotive vehicle or the like, to protect the surface of the vehicle from damaging contact by foreign objects comprising:
    a plurality of discrete elongate tubular members each having a surface for contacting the side surface of the vehicle and another surface extending outwardly therefrom for engagement by foreign objects which might otherwise contact such vehicular surface;

flexible means resiliently interconnecting one end of each said tubular member with an adjacent end of at least one other said tubular member to yieldingly urge together said interconnected ends, so that said interconnecting plural tubular members tend to assume to substantially linear elongate end-to-end first configuration; interconnecting sufficiently said means being flexible to permit said tubular members to be manually folded alongside one another to assume a relatively compact side-by-side second configuration; and attachment means disposed at the free end of the tubular member at each end of said elongate configuration, said attachment means being operative for removable attachment to the vehicle to maintain said elongate configuration of tubular members alongside the automobile.

7. Apparatus as in claim 6, further comprising:

coupling means which selectively engages each of said adjacent interconnecting ends of said tubular members to provide a predetermined fixed interconnection of said adjacent interconnected tubular members in said first configuration, said coupling means being selectively disengageable from at least one of said interconnecting adjacent ends; and said resilient interconnecting means being connected to said coupling means to elastically urge said coupling means into said interconnection relation with said adjacent ends of said tubular members.

8. Protective apparatus for removable attachment onto the side of an automotive vehicle or the like, to protect the surface of the vehicle from damaging contact by foreign objects comprising:

a plurality of elongate tubular members each having a surface for contacting the side surface of the vehicle and another surface extending outwardly therefrom for engagement by foreign objects which might otherwise contact such vehicular surface;

means resiliently interconnecting one end of each said tubular members with an adjacent end of at lease one other said tubular member to yieldingly urge together said interconnected ends, so that said interconnecting plural tubular members tend to assume a substantially linear elongate end-to-end first configuration;

attachment means disposed at another end of the tubular members at each end of said elongate configuration, said attachment means being operative for removable attachment to the vehicle to maintain said configuration of tubular members alongside the automobile;

coupling means which selectively engages each of said adjacent interconnecting ends to provide a predetermined fixed interconnection of said adjacent interconnected tubular members, said coupling means being selectively disengageable from at least one of said interconnecting adjacent ends;

said resilient interconnecting means being connected to said coupling means to elastically urge said coupling means into said interconnection relation with said adjacent ends of said tubular members;

Adjacent interconnecting ends of said tubular members are hollow;

said coupling means has portions of reduced external dimension which are urged by said resilient interconnecting means to enter said hollow adjacent ends of interconnecting tubular members; and said coupling means has an enlarged portion which prevents the coupling means from entirely entering said hollow ends.

9. Apparatus as in claim 7, wherein:

each of said tubular members has a hollow interior portion; and said resilient interconnecting means comprises an elastic member disposed within said hollow interior portion and engaging said coupling to urge the coupling into an open end of said tubular member.

10. Apparatus as in claim 9, wherein:

each said attachment means includes a first portion for removable attachment to the vehicle and a second portion which is slidably received within said other end of the corresponding tubular member at the respective ends of said elongate configuration; and said elastic member in cach of said end tubular members engages said attachment means at said other end and engages said coupling at said one end, so that said second portion of said attachment means is elastically urged into said tubular member.

* * * * *